UNITED STATES PATENT OFFICE.

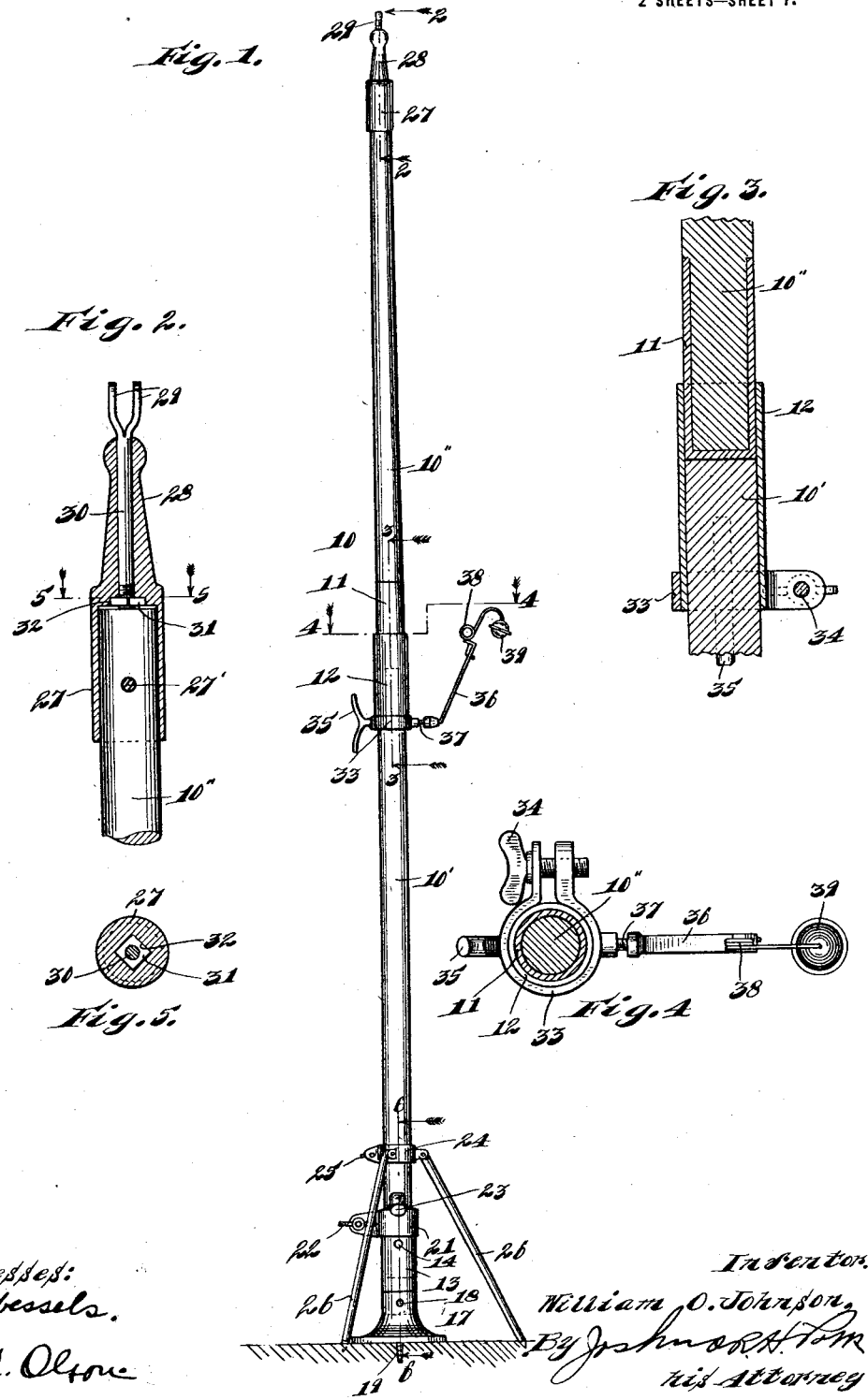

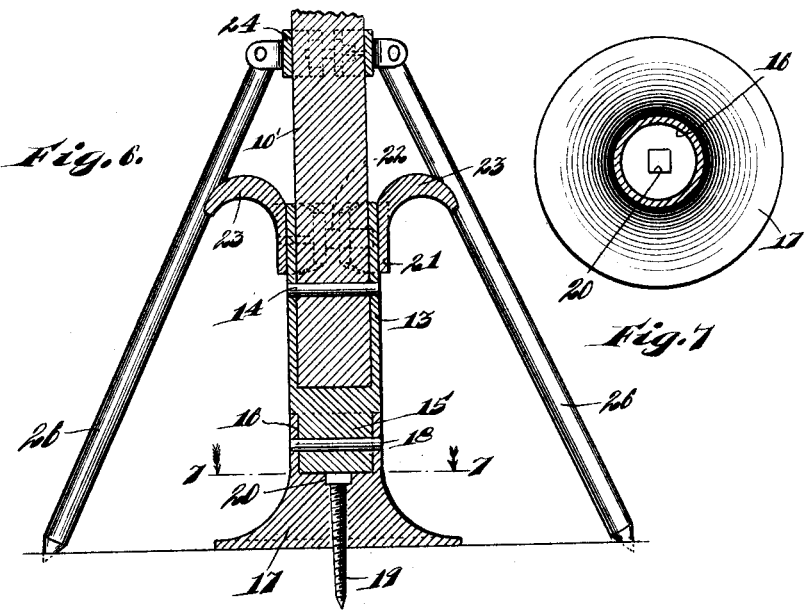
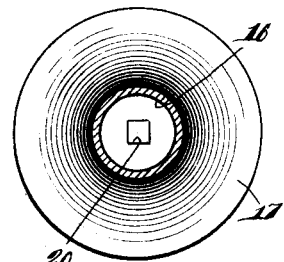
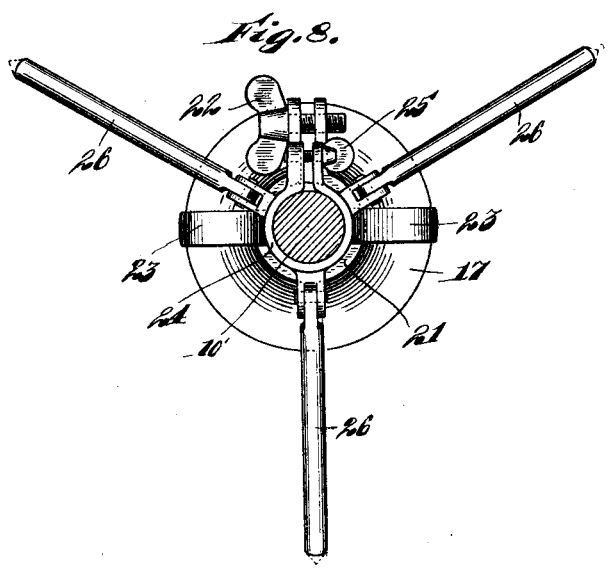

WILLIAM O. JOHNSON, OF CHICAGO, ILLINOIS.

FISHING APPARATUS.

1,181,668.  Specification of Letters Patent.  Patented May 2, 1916.

Application filed January 15, 1915. Serial No. 2,395.

*To all whom it may concern:*

Be it known that I, WILLIAM O. JOHNSON, a citizen of the United States, and a resident of the city of Chicago, county of Cook, and State of Illinois, have invented certain new and useful Improvements in Fishing Apparatus, of which the following is a specification.

My invention relates to improvements in fishing apparatus, and has for its object the production of a device of this character which will be of improved construction and efficient in operation.

Other objects will appear hereinafter.

The invention consists in the combinations and arrangements of parts hereinafter described and claimed.

The invention will be best understood by reference to the accompanying drawings forming a part of this specification, and in which, Figure 1 is a side elevation of a fishing device embodying my invention, Figs. 2, 3 and 4 are enlarged sections taken on lines 2—2, 3—3 and 4—4 respectively of Fig. 1, Fig. 5 is a section taken on line 5—5 of Fig. 2, Fig. 6 is an enlarged section taken on line 6—6 of Fig. 1, Fig. 7 is a section taken on line 7—7 of Fig. 6, and Fig. 8 is a top plan view of the construction shown in Fig. 6.

The preferred form of construction, as illustrated in the drawings, comprises an upright 10 which is formed of two sections 10′ and 10″. The lower end of section 10″ is provided with a ferrule 11 which is adapted to engage or telescope with the outer socket forming end of a sleeve 12 provided at the upper end of section 10′. The arrangement is such that the upright sections may be disconnected if desired in order to reduce the length of the device in carrying or transporting the same.

Provided at the lower end of upright section 10′ is a ferrule 13 secured thereto by a pin 14. The lower end of ferrule 13 is provided with a cylindrical extension 15 which is adapted for engagement in a socket 16 formed in the upper end of a base member 17. The extension 15 is releasably connected with the base member 17 by means of a removable pin 18. Mounted in the base member 17 is a screw 19 the lower end of which projects below said base member for engagement with the ground in securely anchoring the lower end of the upright to the ground during the use of the device. The screw 19 is provided with a square head on its upper end which snugly engages with a recess 20 formed in the bottom of socket 16 whereby said screw is locked against relative rotary movement, as will be readily understood. Also, the arrangement is such that in case of disabling of the screw 19 through wear or breakage, the same may be readily removed upon detachment of ferrule 13 from said base member in order to permit of the insertion of another screw.

Embracing the ferrule 13 is a split band 21 clamped thereto by means of a thumb screw 22 coöperating therewith, as clearly shown in Figs. 1 and 8. Formed upon the band 21 are laterally projecting curved fingers 23 which are adapted for engagement with the rearward ends of fishing rods in order to hold the same in operative position, as will be readily understood. The band 21 is so mounted as to permit of vertical adjustment thereof in order to adjust the fingers 23 into any position desired during employment of the device.

Embracing the lower end of upright section 10′ above the band 21 is a split band 24 adjustably clamped in position by means of a thumb screw 25 coöperating therewith, as clearly shown in Fig. 8. Pivotally connected with the band 23 are three brace arms 26 which are so arranged as to be adapted to rock downwardly to angular position for engagement with the ground, as shown in Figs. 1 and 6, in order to brace the upright.

Arranged upon the upper end of upright section 10″ is a ferrule 27 releasably secured thereto by means of a removable pin 27′. At the upper end of ferrule 27 is provided an upwardly projecting tubular extension 28 in which is loosely mounted the shank 30 of a guide fork 29. The shank 30 carries a nut 31 at its lower end which engages in a recess 32 formed in the bottom of the socket or recess of the ferrule 27, as clearly shown in Fig. 2. By this arrangement it will be seen that the nut 31 serves to lock the guide shank 30 in position, the arrangement being such, however, that upon detachment of the ferrule 27, the nut 31 will be accessible for removal in order to permit of detachment of the guide shank, as will be readily understood.

Arranged upon the upright substantially midway the ends thereof is a split band 33 adjustably clamped in position by means of a thumb screw 34 coöperating with the ends of said band, as clearly shown in Fig. 4. Secured upon the band 33 is a cleat 35 adapted for engagement with the fish line which is passed through the guide 29 in order to fasten one end of the fish line to the upright. Provided at the opposite side of the band 33 is a resilient arm 36 provided at its lower end with a threaded stud 37 which is threaded into a corresponding opening formed in the side of said band. Provided at the outer end of arm 36 is a twisted spring wire 38 which is adapted to frictionally engage with a fish line in the use of the device, as hereinafter described. Carried by the member 38 is a bell 39 adapted to operate upon vibration of the arm 36.

The device is designed for use especially in connection with a "trolley" fishing apparatus. In this apparatus a trolley line is used which in the setting of the apparatus is connected at one end to an anchor which is hurled out into the water the desired distance. This line, in the fishing operation, is held taut and a weighted trolley, to which one end of a line carrying hooks is attached, is mounted in order to carry the last mentioned line down into the water when said line is released, or permit of said line being drawn from the water, said trolley moving up and down said first mentioned line in this operation. With the present apparatus, the first mentioned line, after the outer end thereof carrying the anchor has been hurled out into the water, is passed over the guide 29 and securely fastened by engagement with the cleat 35. The rearward end of the second line, or that carrying the hooks, when the outer end thereof is carried out into the water by the trolley, is engaged with the device 38. The biting or striking of a fish at any of the hooks will cause vibration of the arm 38 which will sound the bell 39 and thus signal the operator.

A device of the construction set forth is of durable and economical construction and may be set up for use at practically any place which affords an engagement for the screw 19. Through the detachable mounting of the various parts, in case of wear, breakage, or disabling for any cause, the same may be readily and easily renewed.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A fishing apparatus comprising an upright; means on said upright for accommodating fish lines; means at the lower end of said upright for fastening the same to the ground, said means comprising a base member to which the lower end of said upright is releasably secured; and a screw mounted in said base member and projecting downwardly therefrom for engagement with the ground, said screw being locked in position by said upright and removable upon detachment of said upright, substantially as described.

2. A fishing apparatus comprising an upright; means on said upright for accommodating fish lines; means at the lower end of said upright for fastening the same to the ground, said means comprising a base member to which the lower end of said upright is releasably secured; a screw mounted in said base member and projecting downwardly therefrom for engagement with the ground, said screw being locked in position by said upright and removable upon detachment of said upright; a head at the end of said screw; and a socket in said base member adapted to snugly receive said head to lock said screw against relative rotary movement, substantially as described.

3. A fishing apparatus comprising an upright; means on said upright for accommodating fish lines; means at the base of said upright for fastening the same to the ground, said means comprising a member at the lower end of said upright adapted to pierce the ground; a band releasably embracing said upright adjacent the lower end thereof; and a plurality of bracing arms pivotally connected with said band and adapted to project angularly therefrom into contact with the ground, substantially as described.

4. A fishing apparatus comprising an upright; means on said upright for accommodating fish lines; means on said upright adjacent the base thereof adapted for engagement with the rearward ends of fishing rods for holding the same in operative position; and means at the base of said upright for fastening the same to the ground, substantially as described.

5. A fishing apparatus comprising an upright; means on said upright for accommodating fish lines; means on said upright adjacent the base thereof adapted for engagement with the rearward ends of fishing rods for holding the same in operative position; means for releasably locking said last mentioned means in position to permit of vertical adjustment thereof on said upright; and means at the base of said upright for fastening the same to the ground, substantially as described.

6. A fishing apparatus comprising an upright; means for securing said upright to the ground; and a band on said upright adjacent the lower end thereof having outwardly projecting fingers concave at their undersides for engagement with the rearward ends of fishing rods for holding the same in operative position, substantially as described.

In testimony whereof I have signed my name to this specification in the presence of two subscribing witnesses.

WILLIAM O. JOHNSON.

Witnesses:
JOSHUA R. H. POTTS,
HELEN F. LILLIS.

Copies of this patent may be obtained for five cents each, by addressing the "Commissioner of Patents, Washington, D. C."